United States Patent [19]
Tateoka

[11] Patent Number: 4,585,314
[45] Date of Patent: Apr. 29, 1986

[54] PROJECTION LENS
[75] Inventor: Masamichi Tateoka, Yokohama, Japan
[73] Assignee: Canon Kabushiki Kaisha, Tokyo, Japan
[21] Appl. No.: 603,767
[22] Filed: Apr. 25, 1984
[30] Foreign Application Priority Data
Apr. 28, 1983 [JP] Japan .................................. 58-75834
[51] Int. Cl.[4] .......................... G02B 9/62; G02B 13/04
[52] U.S. Cl. ..................................... 350/464; 350/426
[58] Field of Search ................................ 350/464, 426

[56] References Cited
U.S. PATENT DOCUMENTS
4,195,912  4/1980  Doi et al. ............................ 350/426

FOREIGN PATENT DOCUMENTS
0044554  4/1979  Japan .................................. 350/426

Primary Examiner—John K. Corbin
Assistant Examiner—Rebecca D. Gass
Attorney, Agent, or Firm—Fitzpatrick, Cella, Harper & Scinto

[57] ABSTRACT

This specification discloses a projection lens for projecting an original onto the surface of a sensor and for use in a facsimile apparatus or a digital copying apparatus. The projection lens enables the image of the original to be projected onto the sensor at different projection magnifications with the length of the optical path between the surface of the original and the sensor kept constant. The projection lens comprises, in succession from the object side, a first lens group comprising a negative meniscus lens having its convex surface facing the object side, and a positive meniscus lens having its convex surface facing the object side, the first lens group as a whole having a negative refractive power, and a second lens group having three positive lenses and a negative lens, the second lens group as a whole having a positive refractive power. The first lens group is stationary and the second lens group is movable, whereby the image of the original is projected onto the surface of the sensor at different projection magnifications with the object-image distance being kept constant.

2 Claims, 5 Drawing Figures

PROJECTION LENS

BACKGROUND OF THE INVENTION

1. Field of the Invention

This invention relates to a projection lens which is used at a magnification in the vicinity of 1/10 times and used at two kinds of focal length, i.e., at two kinds of magnification with the object-image distance being kept constant and in which the F-number is relatively bright and various aberrations are well corrected and which is inexpensive.

2. Description of the Prior Art

In recent years, a method has been used in which a solid state image pickup element is used as the reading sensor in a facsimile apparatus or a digital copying apparatus, and is disposed as a scanning light-receiving element on the image plane to scan an original. Also, as the functions of a facsimile apparatus, not only one-to-one magnification but also the enlarging and reducing functions have been required. Generally, in the case of reduction, a method of thinning out picture elements read by the solid state image pickup element is adopted. In the case of enlargement, however, the method of softly adding such picture elements aggravates the quality of image, and therefore, if the magnification of the projection lens during one-to-one magnification is $\beta_1$ and the enlargement ratio is $\beta_2$, projection is effected at a magnification of $\beta_1 \times \beta_2$ onto the surface of the solid state image pickup element by a projection lens. If, then, an attempt is made to use a fixed focus lens to change the magnification thereof, the fixed focus lens must be moved to vary the projection magnification and also the object-image distance must be changed, and thus, the apparatus becomes complicated and the image performance is deteriorated. Also, if two fixed focus lenses are used with the object-image distance kept constant, the change-over of these lenses becomes complex and the use of the two lenses results in an increased cost.

SUMMARY OF THE INVENTION

On the basis of such viewpoints, the present invention is intended to provide a projection lens in which the object-image distance is constant and two different magnifications are provided.

It is a further object of the present invention to provide a projection lens having a bright F-number and a high resolving power.

It is still a further object of the present invention to provide a projection lens which has a wide angle of view and in which distortion is small.

It is yet a further object of the present invention to provide a projection lens in which the off-axis aperture efficiency is 100% and which has no irregularity of illumination.

The projection lens according to the present invention generally comprises, in succession from the object side, a first lens group comprising a negative meniscus lens having its convex surface facing the object side and a positive meniscus lens having its convex surface facing the object side, the first lens group as a whole having a negative refractive power, and a second lens group having three positive lenses and a negative lens, the second lens group as a whole having a positive refractive power, the first lens group being stationary and the second lens group being moved to thereby obtain two different focal lengths with the object-image distance being kept constant.

A number of ordinary zoom lenses for photography in which a first lens group has a negative refractive power and a second lens group has a positive refractive power are known. In the lenses of such a type, however, the first lens group comprises three or four lenses, and this leads to a complicated construction as well as a high cost. In the present invention, in view of the fluctuation of the focal length between two points, the first lens group comprises two lenses, both of which are of a meniscus shape and have a convex surface facing the object side. Such construction of the first lens group has the effect of suitably correcting the spherical aberration and curvature of image field created by the second lens group.

Further, in the projection lens according to the present invention, assuming that the negative meniscus lens in the first lens group is I-1 lens, the positive meniscus lens in the first lens group is a I-2 lens and the second lens group comprises, in succession from the object side, two II-1 and II-2 lenses which are positive lenses, a II-3 lens which is a negative lens and a II-4 lens which is a positive lens, the projection lens satisfies the following condition:

$$1.2 < |f_1/f_2| < 1.7 \quad \text{(I)}$$

$$0.4 < |r_3/f_1| < 0.55 \quad \text{(II)}$$

$$0.9 < |r_9/f_2| < 1.4 \quad \text{(III)}$$

where
$f_1$: focal length of the first lens group
$f_2$: focal length of the second lens group
$r_3$: radius of curvature of the surface of the I-2 lens which is adjacent to the object side
$r_9$: radius of curvature of the surface of the II-3 lens which is adjacent to the object side.

The invention will hereinafter be described in detail with reference to the accompanying drawings.

DESCRIPTION OF THE PREFERRED EMBODIMENTS

Figure 1:
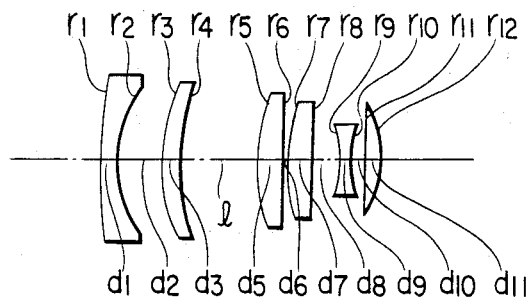
FIG. 1 is a cross-sectional view showing an embodiment of the projection lens according to the present invention.

If a first lens group is a thin lens having a refractive power of $1/f_1$ ($<0$) and a second lens group is a thin lens having a refractive power of $1/f_2$ ($>0$), the object-image distance is L, the reference magnification is M, the enlargement ratio is A, the magnification of the first lens group is $\beta_1$ and the magnification of the second lens group is $\beta_2$, then there are established the following relations:

$$\beta_1 \times \beta_2 = M \quad (1)$$

$$\beta_1 \times 1/\beta_2 = AM \quad (2)$$

When $\beta_1$ and $\beta_2$ are found from equations (1) and (2) and the relation between the object and the image is inserted, there is obtained the following equation:

$$f_1 = \frac{L\sqrt{A} - f_2(2\sqrt{A} + A + 1)}{2\sqrt{A} + A^2M + 1/AM}$$

This equation shows the relation between the refractive powers of the first lens group and the second lens group of the present invention.

The aforementioned condition (I) prescribes the ratio of the refractive powers of the first lens group and the second lens group and, if $|f_1/f_2|$ exceeds the upper limit of this condition, that is, if the refractive power of the second lens group becomes greater, correction of spherical aberration will become difficult. Also, if $|f_1/f_2|$ becomes smaller than the lower limit of this condition, the Petzval sum of the entire system will become negative and correction of the curvature of image field will become difficult and distortion will pose a problem.

The aforementioned condition (II) is a condition for correcting the over-corrected spherical aberration and curvature of image field created by the negative meniscus lens of the first lens group, by the positive meniscus lens of the same first lens group, and if $|r_3/f_1|$ exceeds the lower limit of this condition, spherical aberration and curvature of image field will become over-corrected, while if $|r_3/f_1|$ exceeds the upper limit of this condition, spherical aberration and curvature of image field will become under-corrected.

The aforementioned condition (III) is a condition for correcting the under-correction of the spherical aberration created by two positive lenses disposed on the object side of the second lens group, by the negative lens of the same second lens group, and if $|r_9/f_2|$ becomes smaller than the lower limit of this condition, spherical aberration will become over-corrected, while if $|r_9/f_2|$ exceeds the upper limit of this condition, spherical aberration will become under-corrected. If this is corrected by the radius of curvature $r_{10}$ of the image side surface of the II-3 lens, coma and curvature of image field will be aggravated.

An embodiment of the projection lens of the present invention will now be described. In that embodiment, $f_T$ and $f_W$ represent the two focal lengths of the projection lens, and the case where the value of $f_T$ is shown is a case where both lens groups are close to each other as compared with the case of $f_W$. $F_{NO}$ represents the F-number of the lens, $r_i$ represents the radius of curvature of the ith surface from the object side, $d_i$ represents the on-axis air space or the on-axis thickness between the ith surface and the i+1th surface, n represents the refractive indices of the lenses $\nu$ represents the dispersion values of the lenses, $\beta$ represents the imaging magnification, and l represents the variable value of $d_4$.

Figure 2A:
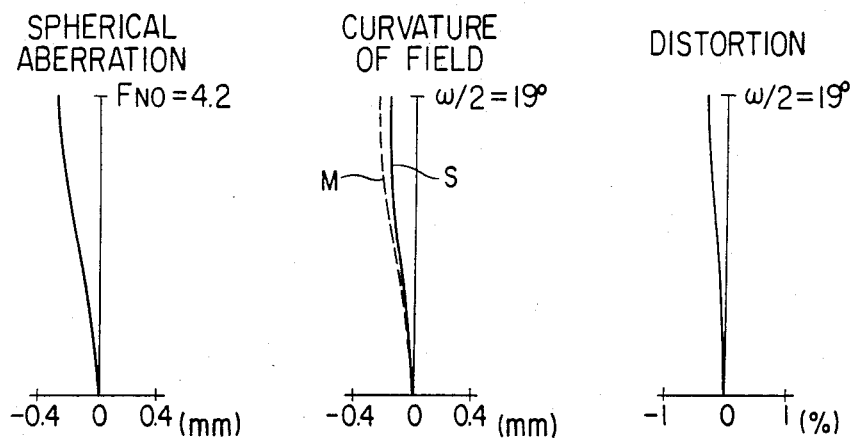
FIGS. 2A, 2B and 3A, 3B show the various aberrations in the projection lens according to the present invention.
Figure 2B:
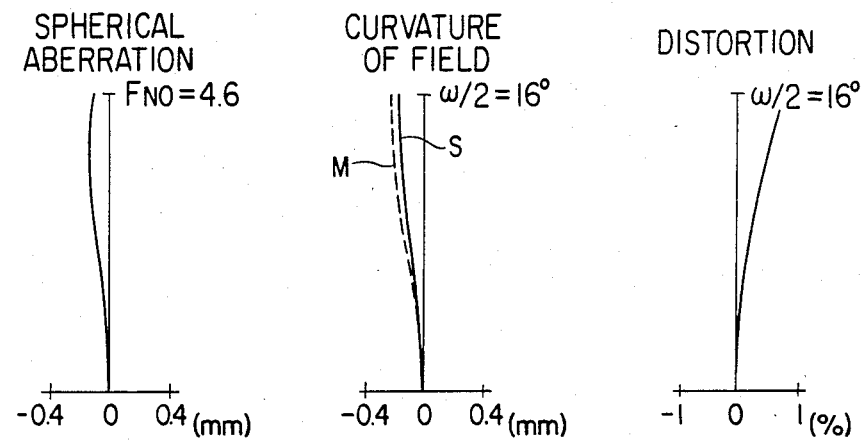
Figure 3A:
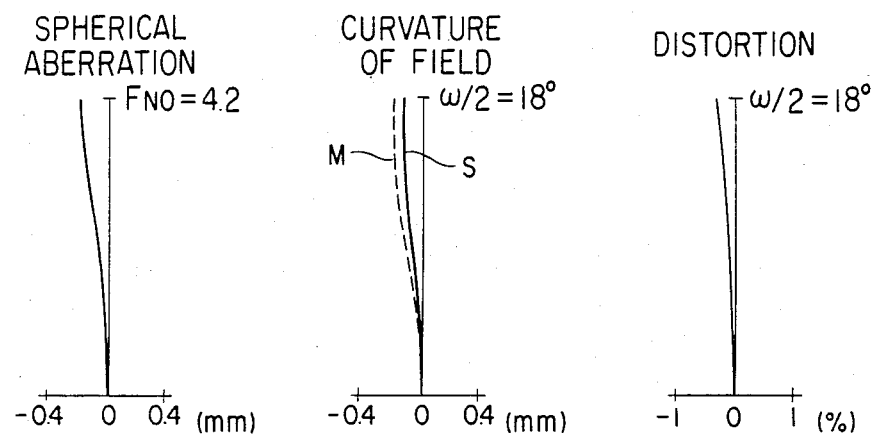
Figure 3B:
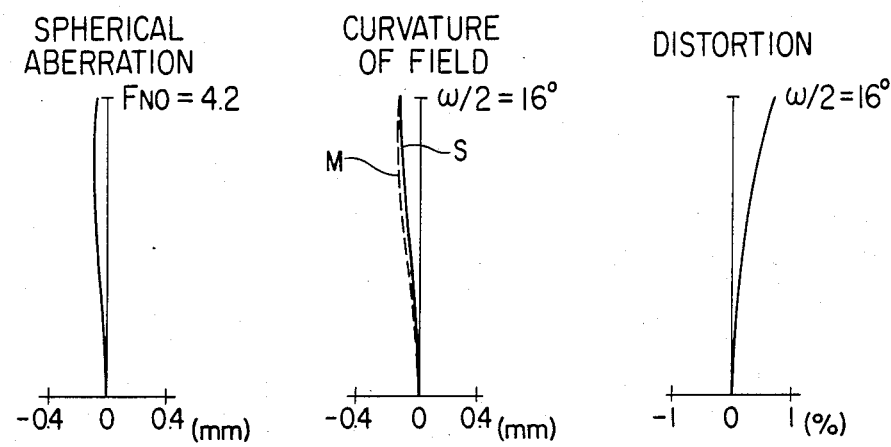

Also, FIG. 1 shows a cross-sectional view of the lens according to a first embodiment, FIGS. 2A and 2B show the various aberrations in the first embodiment, and FIGS. 3A and 3B show the various aberrations in a second embodiment. In FIGS. 2 and 3, M in curvature of image field indicates the meridional image surface and S indicates the sagittal image surface.

| First Embodiment $f_W = 33.0229, f_T = 41.2932, F_{NO} = 4$ | | | | |
|---|---|---|---|---|
| Surface | r | d | n | ν |
| 1 | 94.093 | 2.0 | 1.76651 | 40.1 |
| 2 | 16.997 | 5.96 | | |
| 3 | 21.422 | 2.39 | 1.76168 | 27.5 |
| 4 | 31.905 | l (variable) | | |
| 5 | 24.705 | 3.26 | 1.69979 | 55.5 |
| 6 | −1900.55 | 0.5 | | |
| 7 | 22.59 | 3.49 | 1.69979 | 55.5 |
| 8 | −971.434 | 3.73 | | |
| 9 | −25.537 | 1.15 | 1.81265 | 25.4 |
| 10 | 18.664 | 2.24 | | |
| 11 | −391.15 | 1.97 | 1.76651 | 40.1 |
| 12 | −17.578 | | | |

| | l | β |
|---|---|---|
| $f_W$ | 10.51 | −0.112 |
| $f_T$ | 2.94 | −0.1474 |

$f_1 = -45.03, f_2 = 27.7184$
$|f_1/f_2| = 1.6246, |r_3/f_1| = 0.4757$
$|r_9/f_2| = 0.9213$

FIG. 2A shows the aberrations when $f_W=33.0229$, and FIG. 2B shows the aberrations when $f_T=41.2932$.

| Second Embodiment $f_W = 28.6195, f_T = 36.5594, F_{NO} = 4$ | | | | |
|---|---|---|---|---|
| Surface | r | d | n | ν |
| 1 | 89.339 | 1.74 | 1.76651 | 40.1 |
| 2 | 15.329 | 5.85 | | |
| 3 | 19.517 | 2.08 | 1.76168 | 27.5 |
| 4 | 28.74 | l (variable) | | |
| 5 | 21.938 | 3.16 | 1.69979 | 55.5 |
| 6 | −105.87 | 0.47 | | |
| 7 | 17.205 | 2.64 | 1.69979 | 55.5 |
| 8 | 50.988 | 3.24 | | |
| 9 | −31.108 | 1.0 | 1.81265 | 25.4 |
| 10 | 14.83 | 1.75 | | |
| 11 | 404.91 | 2.16 | 1.76651 | 40.1 |
| 12 | −17.427 | | | |

| | l | β |
|---|---|---|
| $f_W$ | 8.66 | −0.112 |
| $f_T$ | 1.45 | −0.1471 |

$f_1 = -39.4345, f_2 = 24.0938$
$|f_1/f_2| = 1.6367, |r_3/f_1| = 0.4949$
$|r_9/f_2| = 1.2911$

FIG. 3A shows the aberrations when $f_W=28.6195$, and FIG. 3B shows the aberrations when $f_T=36.5594$.

As described above, if the projection lens according to the present invention is applied to a reading apparatus such as a facsimile apparatus or a digital copying apparatus, a fluorescent lamp of low illuminance is usable because the F-number of the lens is bright, and the spacing between an original and the surface of a sensor may be short to make the apparatus compact, because the angle of view of the lens is great. Further, since the lens of the present invention has a high resolving power, sufficient resolution can be achieved even if each of the solid state image sensing elements is 15μ–13μ, and the vignetting factor off the axis of the lens is 100%, whereby there is no irregularity of the quantity of light on the solid state image sensing elements. Furthermore, in the projection lens of the present invention, distortion is small, and therefore, the surface of the original is uniformly projected onto the solid state image sensing elements, and the number of lens components constituting the lens is small and thus, the lens can be provided inexpensively.

What is claimed is:

1. A projection lens having different focal lengths with the object-image distance kept constant, said projection lens comprising, in succession from the object side:
   a first lens group comprising a negative meniscus lens having its convex surface facing the object side and a positive meniscus lens having its convex surface facing the object side, said first lens group as a whole having a negative refractive power, said first lens group being stationary during magnification change; and
   a second lens group disposed on the image side of said first lens group and comprising a II-1 positive lens, a II-2 positive lens, a II-3 negative lens and II-4 positive lens disposed in the named order in succession from the object side to the image side, said second lens group as a whole having a positive refractive power, said second lens group being moved during magnification change with the object-image distance kept constant.

2. A projection lens according to claim 1, satisfying the following conditions:

$$1.2 < |f_1/f_2| < 1.7$$

$$0.4 < |r_3/f_1| < 0.55$$

$$0.9 < |r_9/f_2| < 1.4,$$

where $f_1$ is the focal length of said first lens group, $f_2$ is the focal length of said second lens group, $r_3$ is the radius of curvature of the surface of the positive meniscus lens of said first lens group which is adjacent to the object side, and $r_9$ is the radius of curvature of the surface of said II-3 negative lens which is adjacent to the object side.

* * * * *